(12) United States Patent
Mukherjee

(10) Patent No.: US 9,471,509 B2
(45) Date of Patent: Oct. 18, 2016

(54) MANAGING ADDRESS-INDEPENDENT PAGE ATTRIBUTES

(71) Applicant: Cavium, Inc., San Jose, CA (US)

(72) Inventor: Shubhendu Sekhar Mukherjee, Southborough, MA (US)

(73) Assignee: Cavium, Inc., San Jose, CA (US)

( * ) Notice: Subject to any disclaimer, the term of this patent is extended or adjusted under 35 U.S.C. 154(b) by 57 days.

(21) Appl. No.: 14/662,405

(22) Filed: Mar. 19, 2015

(65) Prior Publication Data

US 2016/0275016 A1   Sep. 22, 2016

(51) Int. Cl.
*G06F 12/08*  (2016.01)
*G06F 12/10*  (2016.01)

(52) U.S. Cl.
CPC ....... *G06F 12/1054* (2013.01); *G06F 12/0802* (2013.01); *G06F 12/0897* (2013.01); *G06F 2212/1021* (2013.01); *G06F 2212/152* (2013.01); *G06F 2212/608* (2013.01); *G06F 2212/657* (2013.01)

(58) Field of Classification Search
CPC ........... G06F 12/1054; G06F 12/0802; G06F 12/0897
USPC ................................ 711/202, 203, 206, 209
See application file for complete search history.

(56) References Cited

U.S. PATENT DOCUMENTS

| | | | |
|---|---|---|---|
| 7,010,633 B2 * | 3/2006 | Arndt .................. | G06F 12/1491 709/240 |
| 7,461,210 B1 | 12/2008 | Wentzlaff et al. | |
| 8,838,914 B2 * | 9/2014 | Adams ................ | G06F 12/1063 711/141 |
| 9,032,398 B2 * | 5/2015 | Ahmad .................. | G06F 12/08 711/105 |
| 9,063,866 B1 * | 6/2015 | Tati ......................... | G06F 12/10 |
| 9,208,103 B2 * | 12/2015 | Kessler ............... | G06F 12/1045 |
| 2015/0363326 A1 * | 12/2015 | Baskakov ........... | G06F 12/1009 711/133 |

OTHER PUBLICATIONS

Azimi et al., "Enhancing Operating System Support for Multicore Processors by Using Hardware Performance Monitoring", Department of Electrical and Computer Engineering, University of Toronto, Canada, pp. 56-65.
Kim et al., "Page Coloring Synchronization for Improving Cache Performance in Virtualization Environment", ICCSA, pp. 495-505, 2011.
Soares et al., Reducing the Harmful Effects of Last-Level Cache Polluters with an OS-Level, Software-Only Pollute Buffer, IEEE pp. 258-269, 2008.
Kim et al., "vCache: Providing a Transparent View of the LLC in Virtualized Environments", IEEE Computer Architecture Letters, pp. 1-4, 2013.

* cited by examiner

*Primary Examiner* — Pierre-Michel Bataille
(74) *Attorney, Agent, or Firm* — Occhiuti & Rohlicek LLP

(57) ABSTRACT

At least one CPU is configured to run a hypervisor at a first access level and at least one guest operating system at a second access level. At the second access level, translating uses mappings in a first page table; and, at the second access level, class information is determined for a memory page mapped by the first page table based on a classification of virtual addresses. At the first access level, translating uses mappings in a second page table; and, at the first access level, class information is determined for the memory page mapped by the second page table based on a classification of intermediate physical addresses. The class information determined at either access level is independent from certain bits used to indicate addresses. Class information determined at different access levels is processed to determine processed class information for the memory page using a dynamic processing rule.

28 Claims, 4 Drawing Sheets

MANAGING ADDRESS-INDEPENDENT PAGE ATTRIBUTES

BACKGROUND

This description relates to managing address independent-page attributes.

Modern processors support 'virtual memory', which allows program instructions being executed by a CPU to refer to virtual addresses within a 'virtual address space' that is larger than a 'physical address space' that is defined by the size of main memory. Virtual memory involves address translation from one or more such virtual address spaces into a physical address space. The translation is performed using a 'page table' that stores mappings between virtual addresses and physical addresses at a granularity of memory pages (or simply 'pages').

Many modern processors also support hierarchical cache systems with multiple levels of cache, including one or more levels within the processor or within each core of a multi-core processor, and one or more levels external to the processor or cores, up to a last level cache (LLC) that is accessed just before main memory is accessed. At each level of the hierarchy, the cache stores copies of a subset of data to speed access to that data by the processor relative to the speed of a higher level cache (or relative to the speed of the main memory for the LLC). Lower level caches are closer to the processor (or core), whereas higher level caches are further away from the processor (or core). The LLC is typically shared by all of the cores of a multi-core processor. At each level, the cache system will load blocks of data into entries and evict blocks of data from entries in units of 'cache lines' (also called 'cache blocks'). Each cache line includes a number of 'words' of data, each word consisting of a predetermined number of bytes. A memory page typically has data from many cache lines.

A technique called 'page coloring' (also called 'cache coloring') involves managing the way in which data from different memory pages are mapped to cache lines. Specifically, a particular portion of a virtual address can be associated with a particular 'color' such that virtual addresses with different colors are guaranteed not to overlap in a cache (e.g., by limiting each color to one or more 'sets' of a set associative cache).

SUMMARY

In one aspect, in general, a method includes: retrieving a first memory page from a storage device in response to a page fault issued after an attempt to retrieve data in the first memory page from a physical address space of a main memory of an external memory system; and managing memory pages from a processor that includes (1) at least one memory management unit coupled to the external memory system, and (2) at least one central processing unit configured to run a hypervisor at a first access level and at least one guest operating system at a second access level. The managing includes: at the second access level, translating from virtual addresses in a virtual address space to intermediate physical addresses in an intermediate physical address space using mappings in a first page table accessed by the guest operating system; at the second access level, determining class information for a second memory page mapped by the first page table based on a classification of virtual addresses within the virtual address space, wherein the class information determined at the second access level is independent from: (1) any bits used to indicate virtual addresses, and (2) any bits used to indicate intermediate physical addresses; at the first access level, translating from the intermediate physical addresses to physical addresses in the physical address space of the main memory using mappings in a second page table accessed by the hypervisor; at the first access level, determining class information for the second memory page mapped by the second page table based on a classification of intermediate physical addresses within the intermediate physical address space, wherein the class information determined at the first access level is independent from: (1) any bits used to indicate intermediate physical addresses, and (2) any bits used to indicate physical addresses; and processing class information for the second memory page determined at different access levels to determine processed class information for the second memory page using a dynamic processing rule.

Aspects can include one or more of the following features.

The method further includes issuing the attempt to retrieve the data in the first memory page in response to a cache miss issued after an attempt to retrieve the data in the first memory page from a first cache line of a first cache of the external memory system.

The managing further includes using the processed class information to store cache lines in selected portions of the first cache.

The first access level has a higher privilege than the second access level.

The central processing unit is configured to manage security for physical addresses in the physical address space of the main memory at a third security level that has a higher privilege than the first access level.

Processing class information for the second memory page determined at different access levels includes processing class information determined at three or more different access levels.

At least one of the class information determined at the first access level or the class information determined at the second access level is determined based on classification of addresses according to attributes of blocks of data within the second memory page.

The attributes of blocks of data within the second memory page comprise estimated reuse of the blocks of data within the second memory page.

The estimated reuse of the blocks of data within the second memory page comprises an estimated miss rate for the blocks of data within the second memory page.

The dynamic processing rule comprises selecting between the class information determined at the first access level and the class information determined at the second access level based on content of one or both of the class information determined at the first access level and the class information determined at the second access level.

The dynamic processing rule comprises combining the class information determined at the first access level and the class information determined at the second access level according to a predetermined function.

The dynamic processing rule is changed at runtime by the guest operating system or the hypervisor.

The first cache comprises a last level cache.

At least one of the class information determined at the first access level or the class information determined at the second access level comprises one or more bits stored within a page table entry cached in a translation lookaside buffer.

In another aspect, in general, an apparatus includes: a storage device configured to store memory pages including a first memory page retrieved from the storage device in response to a page fault issued after an attempt to retrieve data in the first memory page from a physical address space; an external memory system including a main memory controller coupled to main memory having the physical address space; and a processor that includes (1) at least one memory management unit coupled to the external memory system, and (2) at least one central processing unit configured to run a hypervisor at a first access level and at least one guest operating system at a second access level. The processor is configured to: at the second access level, translate from virtual addresses in a virtual address space to intermediate physical addresses in an intermediate physical address space using mappings in a first page table accessed by the guest operating system; at the second access level, determine class information for a second memory page mapped by the first page table based on a classification of virtual addresses within the virtual address space, wherein the class information determined at the second access level is independent from: (1) any bits used to indicate virtual addresses, and (2) any bits used to indicate intermediate physical addresses; at the first access level, translate from the intermediate physical addresses to physical addresses in the physical address space of the main memory using mappings in a second page table accessed by the hypervisor; at the first access level, determine class information for the second memory page mapped by the second page table based on a classification of intermediate physical addresses within the intermediate physical address space, wherein the class information determined at the first access level is independent from: (1) any bits used to indicate intermediate physical addresses, and (2) any bits used to indicate physical addresses; and process class information for the second memory page determined at different access levels to determine processed class information for the second memory page using a dynamic processing rule.

Aspects can include one or more of the following features.

The attempt to retrieve the data in the first memory page from the physical address space is issued in response to a cache miss, and the external memory system further includes a first cache configured to store a plurality of cache lines and to issue the cache miss after an attempt to retrieve the data in the first memory page from at least one of the cache lines.

The processor is further configured to use the processed class information to store cache lines in selected portions of the first cache.

The first access level has a higher privilege than the second access level.

The central processing unit is configured to manage security for physical addresses in the physical address space of the main memory at a third security level that has a higher privilege than the first access level.

Processing class information for the second memory page determined at different access levels includes processing class information determined at three or more different access levels.

At least one of the class information determined at the first access level or the class information determined at the second access level is determined based on classification of addresses according to attributes of blocks of data within the second memory page.

The attributes of blocks of data within the second memory page comprise estimated reuse of the blocks of data within the second memory page.

The estimated reuse of the blocks of data within the second memory page comprises an estimated miss rate for the blocks of data within the second memory page.

The dynamic processing rule comprises selecting between the class information determined at the first access level and the class information determined at the second access level based on content of one or both of the class information determined at the first access level and the class information determined at the second access level.

The dynamic processing rule comprises combining the class information determined at the first access level and the class information determined at the second access level according to a predetermined function.

The dynamic processing rule is changed at runtime by the guest operating system or the hypervisor.

The first cache comprises a last level cache.

At least one of the class information determined at the first access level or the class information determined at the second access level comprises one or more bits stored within a page table entry cached in a translation lookaside buffer.

Aspects can have one or more of the following advantages.

Using a 'page classification' technique, any of a variety of different types of page attributes for a particular page can be dynamically managed within a page table entry for that page. Separate page class information can be provided at different access levels, for example, by storing the appropriate class bits within different pages tables for the different access levels. The class bits can be used to encode class information that classifies the pages into different performance classes, for example, which can optionally be used by the processor to enhance performance. Because the class bits are separate from the address bits of the mapping for a particular page, the class information can be determined independently from the translation performed for that page. The class information for a particular address within a page can be dynamically processed (e.g., at runtime) from the class information determined at the different access levels using a dynamic processing rule. A dynamic decision can be made to use the class information as a performance hint (e.g., to manage a cache or coalescing write buffer) based on various factors, or to simply ignore the class information under certain circumstances. Techniques for mitigating cache pollution can take advantage of this dynamic processing and the address independence to provide explicit reuse information for a page at any access level.

Other features and advantages of the invention will become apparent from the following description, and from the claims.

DESCRIPTION

Figure 1:
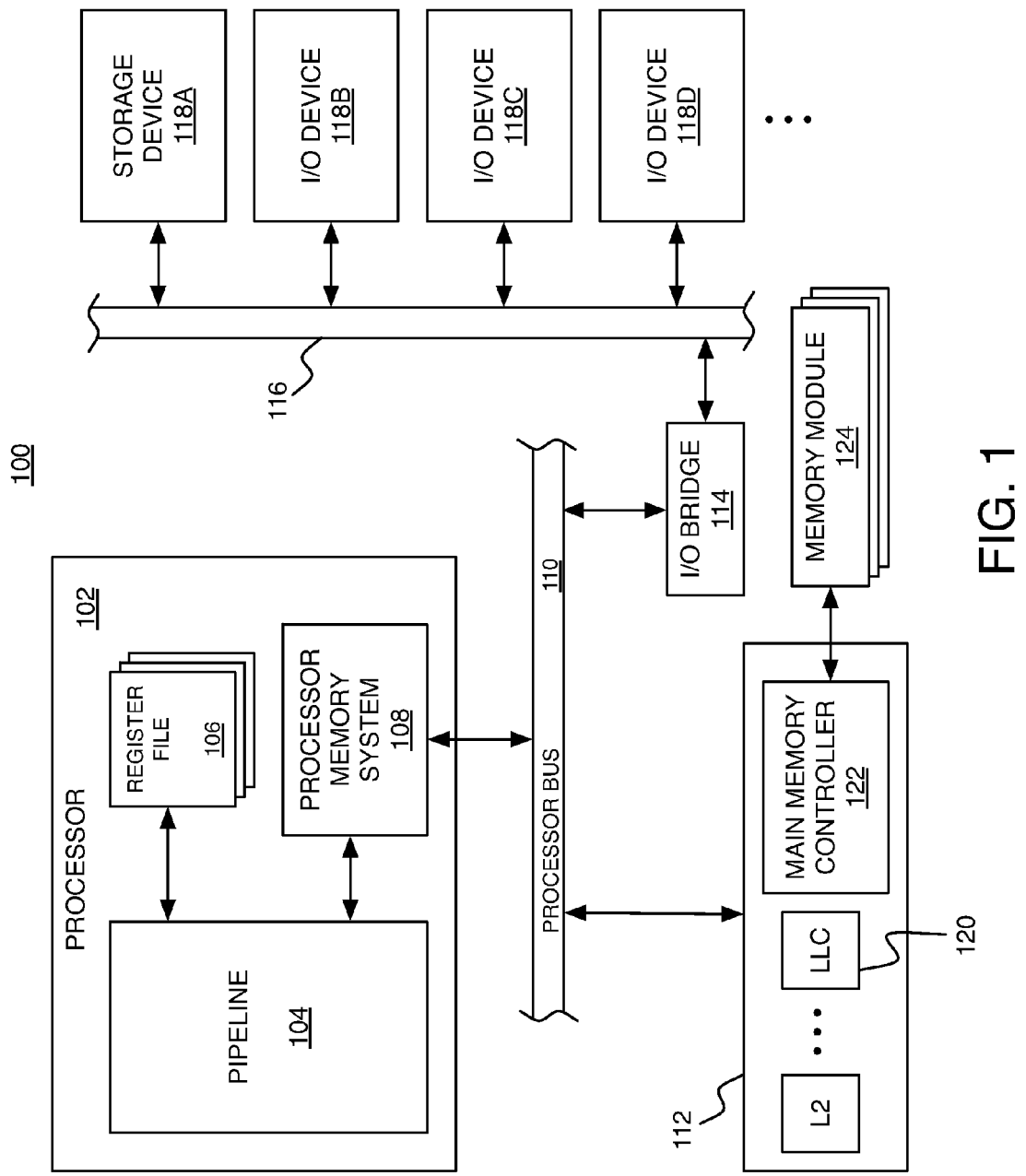
FIG. 1 is a schematic diagram of a computing system.

Some processors support various kinds of virtualization that involve 'virtual machines' (VMs). These kinds of virtualization include 'core virtualization', which enables multiple guest operating systems to each run in its own separate VM while sharing the same physical system hardware, and 'I/O virtualization' in which multiple I/O streams are coupled to and come from different VMs. A 'hypervisor' (also called a virtual machine monitor (VMM)) runs on the physical system to manage all of the guest operating systems of a virtualized system. The hypervisor runs at higher-privileged access level than the guest operating systems. So only the hypervisor has access to the physical address space. Therefore, each guest operating system is provided its own 'intermediate physical address space' into which one or more virtual address spaces are translated, and the hypervisor translates intermediate physical addresses into physical addresses. The combination of virtual memory and VM virtualization schemes can cause problems for some approaches to mitigating a potential issue that may arise in a cache called 'cache pollution'.

Cache pollution refers to a situation in which cache lines with lower reusability displace cache lines with higher reusability. Reusability refers to the likelihood that data in a particular cache line will be accessed again after being loaded into the cache and before being evicted. One solution for mitigating this cache pollution problem is the use of a 'pollute buffer', which is a portion of the cache used to store cache lines with low reusability, preserving most of the cache for cache lines with high reusability. Page coloring has been used to mitigate cache pollution in some virtualization schemes, however, since page coloring relies on a portion of the address of a cache line, it cannot be performed independently from address translation. The page classification technique, described in more detail below, will enable mitigation of cache pollution in a matter that can be performed independently from address translation.

To further understand how virtual memory and these virtualization schemes affect cache management, it is helpful to understand the operation of cache systems. Effective cache performance relies on two properties of the data access patterns: temporal locality, and spatial locality with respect to data that has just been accessed. Temporal locality means that the same data is likely to be accessed again soon. Spatial locality means that data located in nearby addresses is likely to be accessed soon. Unfortunately, certain data sets do not exhibit significant temporal or spatial locality. When a cache line with such data is stored in a cache entry, it replaces another cache line that may have higher temporal and/or spatial locality. Data with higher temporal and/or spatial locality is more reusable than data with lower temporal and/or special locality.

In some cache pollution mitigation schemes, reusability is estimated using cache miss rates. Cache miss rates of virtual addresses are sampled, and then data with virtual addresses that have high miss rates are mapped to a portion of physical address space that is stored in a relatively small region of a cache called a pollute buffer. By restricting high miss rate data to the pollute buffer, the evictions caused by the frequent misses for that data will only affect other data that also has high miss rates, which preserves data with low miss rates in another region of the cache outside of the pollute buffer. One way to map a virtual address to a physical address that is guaranteed to be restricted to a particular region of the cache is to restrict an 'index' portion of the physical address used to select a particular 'set' of a set associative cache. This mechanism works well in a non-virtualized system in which an operation system has direct control of a machine's physical address layout. However, this mechanism may not work as well in a virtualized system where a guest operating system may not have direct control of a host machine's physical address layout. Alternative techniques for providing a pollute buffer for a virtualized system involve providing reuse information that is independent from the addresses and can be efficiently managed at the multiple access levels of the guest operating systems and the hypervisor using page classification.

FIG. 1 shows an example of a computing system 100 in which page classification techniques can be used. The system 100 includes at least one processor 102, which could be a single central processing unit (CPU) or an arrangement of multiple processor cores of a multi-core architecture. In this example, the processor 102 includes a pipeline 104, one or more register files 106, and a processor memory system 108. The processor 102 is connected to a processor bus 110, which enables communication with an external memory system 112 and an input/output (I/O) bridge 114. The I/O bridge 114 enables communication over an I/O bus 116, with various different I/O devices including a storage device 118A and other I/O devices 118B-118D (e.g., network interface, display adapter, and/or user input devices such as a keyboard or mouse). The storage device 118A such as a disk drive or other large capacity (typically non-volatile) storage device can spare some space to serve as secondary storage (or a 'backing store') in a virtual memory scheme for the (typically volatile) main memory, as described in more detail below.

The processor memory system 108 and external memory system 112 together form a hierarchical cache system including at least a first level (L1) cache within the processor memory system 108, and any number of higher level (L2, L3, . . . ) caches within the external memory system 112. The highest level cache within the external memory system 112 (which may be the L2 cache if there are only two levels in the hierarchy) is the LLC 120, which is accessed just before main memory. Of course, this is only an example. The exact division between which level caches are within the processor memory system 108 and which are in the external memory system 112 can be different in other examples. For example, the L1 cache and the L2 cache could both be internal to the processor 102, and the L3 (and higher) caches could be external to the processor 102. If the processor 102 is a multi-core processor, each core could have its own internal L1 cache, and the cores could share an L2 cache. The external memory system 112 also includes a main memory controller 122, which is connected to any number of memory modules 124 serving as main memory (e.g., Dynamic Random Access Memory modules).

In a particular cache of any level of the hierarchy, each cache entry includes space for storing the data words of a particular cache line along with bits for a tag (which contains a number of the most significant bits of an address, which are common to the words of that entry) and space for other information (e.g., a valid bit and any flags or error correction code bits). For a set associative cache, before comparing a tag portion of a memory address of desired data, the cache system compares an index portion of the address to determine in which of multiple sets the cache line containing that data may be stored. For an N-way set associative cache, the tag comparison is performed N times (possibly in parallel), once for each of N 'ways' in which the cache line containing the data may be stored. The lowest order bits of an address (also called a 'block offset') are used to select a particular word from a cache line that is found in the cache (i.e., a 'cache hit'). If the cache line is not found in the cache (i.e., a 'cache miss'), then the cache system attempts to retrieve the cache line from a higher level cache, or from the main memory (in the case of the LLC).

Figure 2:
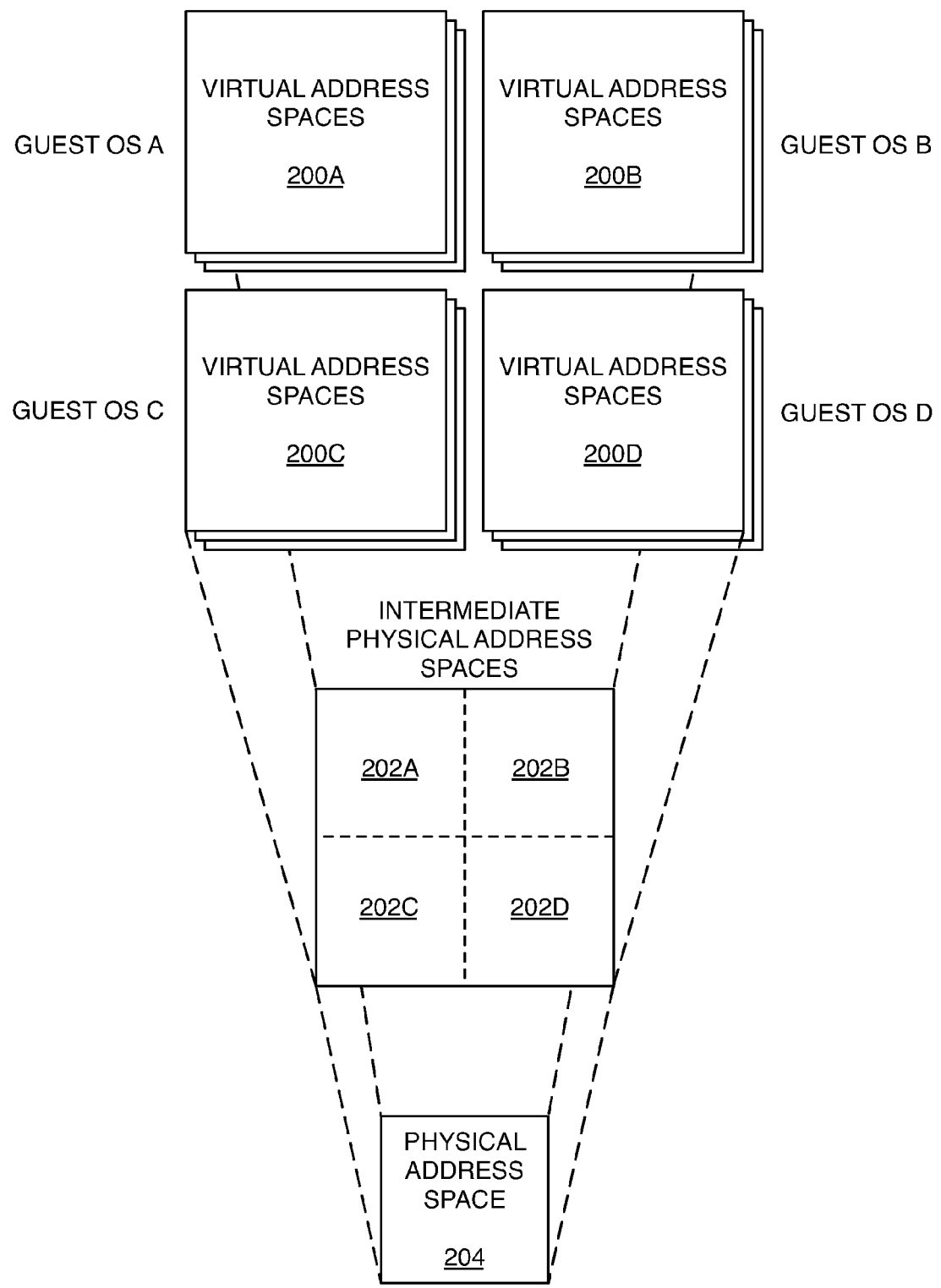
FIG. 2 is a schematic diagram illustrating different levels of address spaces.

FIG. 2 illustrates relationships among different address spaces in an example of a virtualized system with virtual memory. As described above, there are three types of addresses: virtual address (VA), intermediate physical address (IPA), and physical address (PA). One or more guest operating systems (OSs) run within the hypervisor, which runs directly on the host such as computing system 100. In this example, there are four guest OSs: guest OS A, guest OS B, guest OS C, and guest OSD. Each guest OS provides one or more virtual address spaces for programs running in that guest OS, and manages translation of VAs within those virtual address spaces to IPAs within an intermediate physical address space. In this example, guest OS A provides virtual address spaces 200A, and manages translations to intermediate physical address space 202A; guest OS B provides virtual address spaces 200B, and manages translations to intermediate physical address space 202B; guest OS C provides virtual address spaces 200C, and manages translations to intermediate physical address space 202C; and guest OS D provides virtual address spaces 200D, and manages translations to intermediate physical address space 202D. The hypervisor running underneath each guest operating system manages translation of IPAs within all of the intermediate physical address spaces to PAs within the physical address space 204 corresponding to the actual physical storage locations within main memory. Portions of the PA are used as tags, indexes, and offsets to access data in a cache in the cache system, such as the LLC 120. For cache pollution mitigation techniques in which a guest OS uses the VA-to-IPA translation to restrict high miss rate data to a 'software pollute buffer' based on a portion of the IPA, there would need to be a mechanism for the hypervisor to determine that the software pollute buffer is mapped to specific IPA regions for any software optimizations performed by the guest OS to be useful for optimizing a hardware pollute buffer based on a portion of the PA.

As an alternative to using a portion of the addresses to map certain data to a pollute buffer, the page tables used to store mappings can be augmented with one or more 'class bits' used for classifying pages according to any of a variety of page attributes. Reusability is one example of such a page attribute. These class bits can be used to store explicit reuse information that encodes a quantitative estimate of the reusability of particular pages, which is then used to efficiently divert cache lines on certain pages to a selected portion of the cache serving as a pollute buffer. The class bits can alternatively be used for other attributes of a page. For example, the class bits can be used to provide a quantitative estimate of how heavily a page is being written to (e.g., how many store instructions are issued with addresses in that page). The processor 102 can then interpret this class information as a performance hint used to optimize operation of a coalescing write buffer that stores data temporarily before it is written back from a cache to main memory. Such a write buffer may be included within a buffered write-through cache system. Data from a page that is indicated by the class bits as a 'heavily written' page can generally be kept in the write buffer for a longer period of time than a page that is indicated by the class bits as a 'lightly written' page.

Figure 3A:
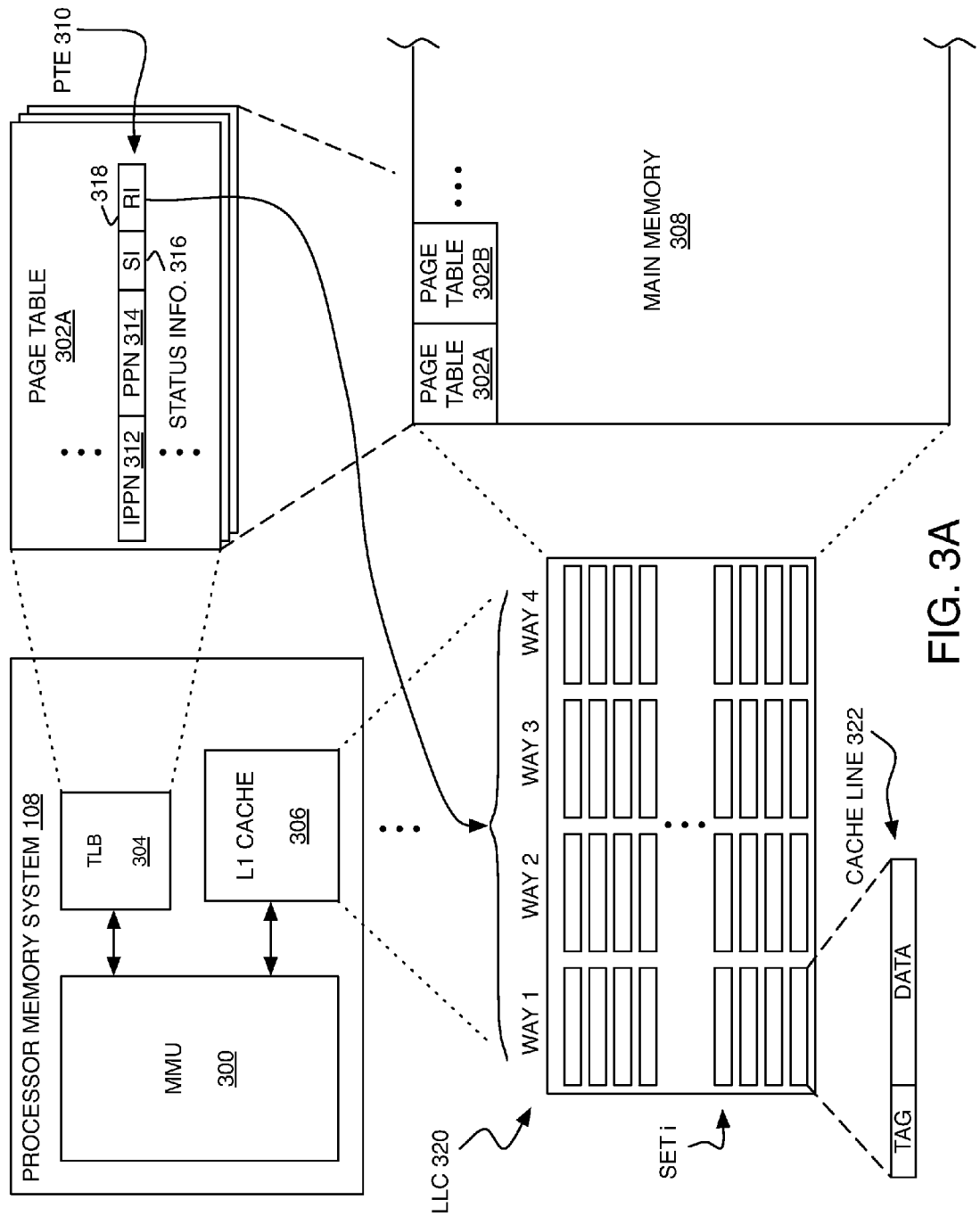
FIGS. 3A and 3B are schematic diagrams illustrating a procedure for managing class information.
Figure 3B:
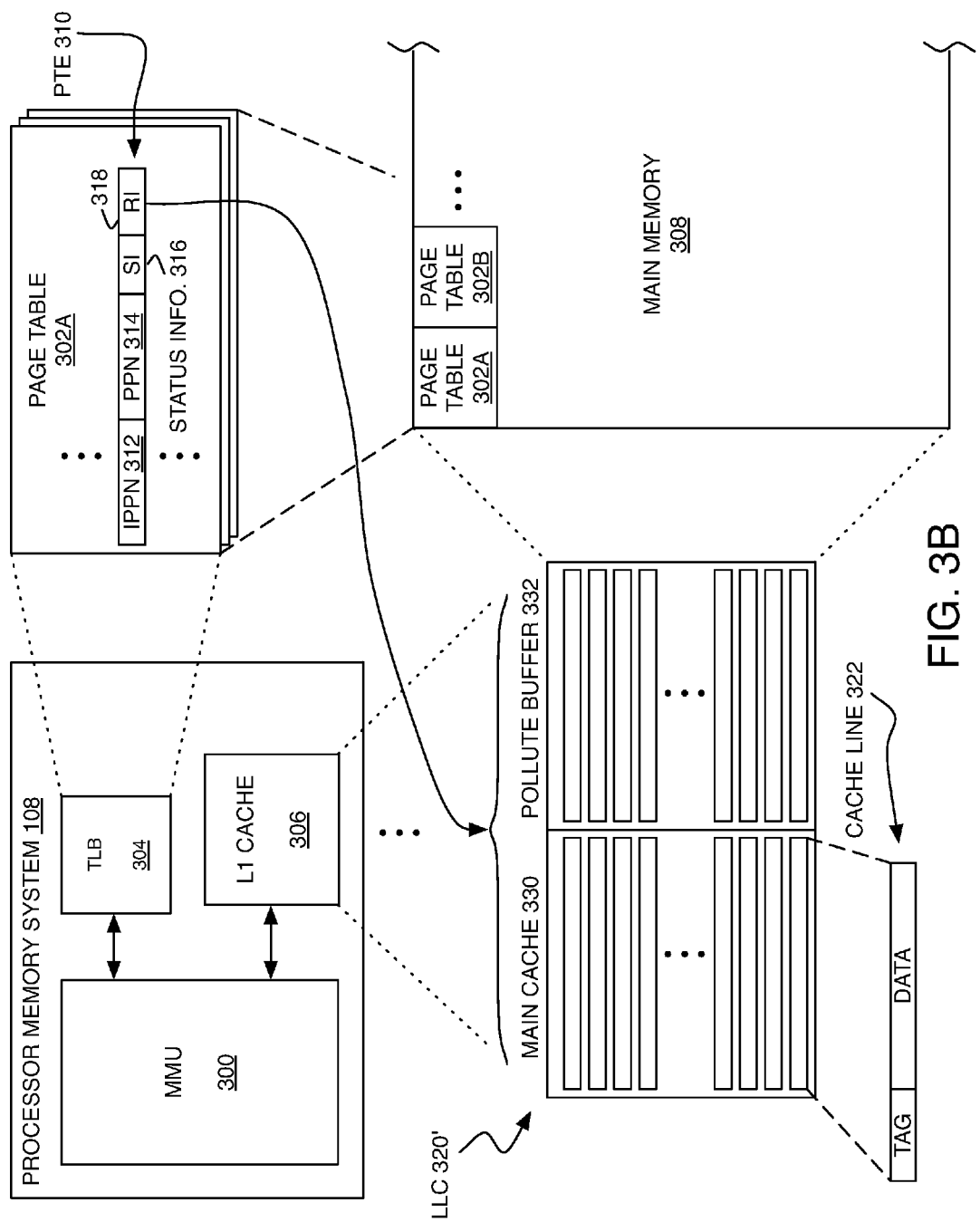

FIGS. 3A and 3B illustrate examples of a procedure for managing and applying reuse information using class bits. The processor memory system 108 includes a memory management unit (MMU) 300 that the hypervisor uses for translation of IPAs to PAs. In a virtualized system the translation by the guest OSs of VAs to IPAs may be handled entirely in software, or the guest OSs may have some hardware assistance from the MMU 300. In either case, there will be page tables for use by the guest OSs with entries that store VA-to-IPA mappings, and a separate page table for use by the hypervisor with entries that store IPA-to-PA mappings. A page table 302A is an example of such a page table for use by the hypervisor for translating IPAs, which is typically stored in main memory 308 along with a number of additional page tables including a page table 302B, which may be used by a guest OS for translating VAs.

The processor memory system 108 also includes a translation lookaside buffer (TLB) 304 for caching frequently used page table entries from one or more page tables. This enables the translation to be performed without necessarily having to access main memory to retrieve a page table entry. The processor memory system 108 also includes an L1 cache 306, and various other circuitry for handling a miss in either the TLB 304 or the L1 cache. When a load or store instruction is executed, the TLB 304 is used to translate a memory address of that instruction (from a VA to an IPA to a PA). The processor 102 also determines whether a copy of the data from that memory address is in any of the levels of the hierarchical cache system, from the L1 cache 306 up to an LLC 320 if necessary. If so, that instruction can be executed from the cache system. If not, that instruction can be handled by miss circuitry so that it may be executed after accessing main memory 308 directly.

In this example, a page table entry (PTE) 310 of the page table 302A stores an intermediate physical page number 312 and a physical page number 314, which serve as a mapping between an IPA and a PA. Because the low order bits comprising the page offsets are identical for an IPA and its mapped PA, that leaves only the high order bits comprising the page numbers to specify the mapping. Likewise, a PTE of the page table 302B stores a virtual page number and an intermediate physical page number, which serves as a mapping between a VA and an IPA. The PTE 310 also includes status information 316, such as information indicating whether or not the page is resident in main memory 308 or needs to be retrieved from secondary storage (e.g., storage device 118A). When the PTE 310 is stored in the TLB 304, there may also be additional information for managing the transfer of PTEs between a full page table and the TLB 304.

An additional set of one or more class bits 318 in the PTE 310 is provided for classifying a page. When the class bits 318 store reuse information, it provides a mechanism that allows a guest OS to convey to the underlying cache system, at any level between the L1 cache 306 and the LLC 320, a quantitative estimate of the reusability of the data stored on a particular page. In some implementations, the reuse information is binary and can therefore be encoded using a single 'reuse bit' (e.g., 0=low reusability, or 1=high reusability). In the binary case, a threshold can be selected to differentiate between low and high reusability. If the average miss rate for cache lines within a particular page is above the threshold, then the reuse bit is set to 0 (i.e., high miss rate=low reusability). If the average miss rate for cache lines within a particular page is below the threshold, then the reuse bit is set to 1 (i.e., low miss rate=high reusability). If additional bits are used to encode the reuse information, a more fine-grained quantitative estimate can be encoded (e.g., 2 bits provides 4 reuse levels determined using 3 thresholds).

In some implementations, each guest OS is responsible for maintaining reuse information for pages in a VA-to-IPA page table, and the hypervisor is responsible for maintaining reuse information for pages in a IPA-to-PA page table. For both types of page tables, the reuse information would be copied within the class bits 318 along with an entire PTE when that PTE cached in the TLB 304. For any level cache in the cache system that is configured with a pollute buffer based on reuse information, the cache system uses the reuse information for a particular page from the class bits 318 of one or both page tables to select a portion of that cache for accessing a cache line 322 that falls within that particular page. FIGS. 3A and 3B illustrate examples in which the LLC 320 is configured with a pollute buffer. The page that contains a particular cache line can be determined by using the appropriate portion of the tag and index for that cache line that corresponds to the address bits used for the page number.

The guest OS and the hypervisor could potentially estimate different quantitative values for the reuse information for the same page. The cache system can be configured to process the reuse information, or other class information, from both translation stages (i.e., from both page tables) in any of a variety of ways using dynamic processing rules. For example, the cache system can use a dynamic processing rule for selecting between the guest OS class information and the hypervisor class information. One such rule for binary reuse information as the class information could be: if the guest OS indicates 'low reusability' and the hypervisor indicates 'high reusability', then select 'low reusability' as the reuse information. Alternatively, the cache system can use a dynamic processing rule that uses a predetermined function to combine the class information from both translation stages, potentially resulting in a more fine-grained estimate as the combined reuse information. Whether it is one of the values of class information from either translation stage that is selected based on a dynamic processing rule, or it is a predetermined function used as a dynamic processing rule to combine the class information and derive resulting class information that may be different from that of either stage, the dynamic processing can be implemented by storing a mapping between the possible values for both stages and the corresponding result. In some implementations, the dynamic processing rule can be changed at runtime by a guest operating system or the hypervisor. For example, the hypervisor can configure the cache system to dynamically override the table and use reuse information from any of the translation stages or access levels, or to turn off the pollute buffer and ignore the reuse information based on certain attributes of the software and/or hardware. Such dynamic processing may also be facilitated by the ability to dynamically change the class bits for a page via its page table entry. The following table is an example of a mapping table for a system with two stages and binary reuse information.

Reuse Information Mapping Table

| Guest OS stage | Hypervisor stage | Resulting reuse information |
| --- | --- | --- |
| low reusability | low reusability | low reusability |
| low reusability | high reusability | low reusability |
| high reusability | low reusability | low reusability |
| high reusability | high reusability | high reusability |

In some processor architectures, there are additional access levels beyond those for the guest OS and the hypervisor. For example, there may be a lowest-privileged access level L0 for user programs running in a guest OS, an access level L1 for a guest OS, an access level L2 for a hypervisor, and a highest privileged access level L3 for a security system managing secure and non-secure pages within main memory. Some implementations may enable each access level to maintain its own class information for pages, and the cache system can process class information from any combination of levels to determine the ultimate class information used to access the LLC 320, or for any other purpose.

There are a variety of techniques for storing cache lines in selected portions of a cache in order to provide a pollute buffer. In the example of FIG. 3A, the LLC 320 is a 4-way set associative cache. The cache system can use one of the ways (e.g., WAY 4) as a pollute buffer for cache lines on pages with 'low reusability', and can use the other ways (WAYS 1-3) as the main cache for cache lines on pages with 'high reusability'. In the example of FIG. 3B, the LLC 320' is a physically split cache with separate dedicated main cache 330 and pollute buffer 332. The cache system still uses the reuse information from one or both translation stages to select between the main cache 330 and pollute buffer 332.

Other embodiments may fall within the scope of the following claims, which do not necessarily include all of the features or advantages of the embodiments described above.

What is claimed is:

1. An apparatus comprising:
  a storage device configured to store memory pages including a first memory page retrieved from the storage device in response to a page fault issued after an attempt to retrieve data in the first memory page from a physical address space;
  an external memory system including a main memory controller coupled to main memory having the physical address space; and
  a processor that includes (1) at least one memory management unit coupled to the external memory system, and (2) at least one central processing unit configured to run a hypervisor at a first access level and at least one guest operating system at a second access level;
  wherein the processor is configured to:
    at the second access level, translate from virtual addresses in a virtual address space to intermediate physical addresses in an intermediate physical address space using mappings in a first page table accessed by the guest operating system;
    at the second access level, determine class information for a second memory page mapped by the first page table based on a classification of virtual addresses within the virtual address space, wherein the class information determined at the second access level is independent from: (1) any bits used to indicate virtual addresses, and (2) any bits used to indicate intermediate physical addresses;
    at the first access level, translate from the intermediate physical addresses to physical addresses in the physical address space of the main memory using mappings in a second page table accessed by the hypervisor;
    at the first access level, determine class information for the second memory page mapped by the second page table based on a classification of intermediate physical addresses within the intermediate physical address space, wherein the class information determined at the first access level is independent from: (1) any bits used to indicate intermediate physical addresses, and (2) any bits used to indicate physical addresses; and
    process class information for the second memory page determined at different access levels to determine processed class information for the second memory page using a dynamic processing rule.

2. The apparatus of claim 1, wherein the attempt to retrieve the data in the first memory page from the physical address space is issued in response to a cache miss, and the external memory system further includes a first cache configured to store a plurality of cache lines and to issue the cache miss after an attempt to retrieve the data in the first memory page from at least one of the cache lines.

3. The apparatus of claim 2, wherein the processor is further configured to use the processed class information to store cache lines in selected portions of the first cache.

4. The apparatus of claim 1, wherein the first access level has a higher privilege than the second access level.

5. The apparatus of claim 4, wherein the central processing unit is configured to manage security for physical addresses in the physical address space of the main memory at a third security level that has a higher privilege than the first access level.

6. The apparatus of claim 5, wherein processing class information for the second memory page determined at different access levels includes processing class information determined at three or more different access levels.

7. The apparatus of claim 1, wherein at least one of the class information determined at the first access level or the class information determined at the second access level is determined based on classification of addresses according to attributes of blocks of data within the second memory page.

8. The apparatus of claim 7, wherein the attributes of blocks of data within the second memory page comprise estimated reuse of the blocks of data within the second memory page.

9. The apparatus of claim 8, wherein the estimated reuse of the blocks of data within the second memory page comprises an estimated miss rate for the blocks of data within the second memory page.

10. The apparatus of claim 1, wherein the dynamic processing rule comprises selecting between the class information determined at the first access level and the class information determined at the second access level based on content of one or both of the class information determined at the first access level and the class information determined at the second access level.

11. The apparatus of claim 1, wherein the dynamic processing rule comprises combining the class information determined at the first access level and the class information determined at the second access level according to a predetermined function.

12. The apparatus of claim 1, wherein the dynamic processing rule is changed at runtime by the guest operating system or the hypervisor.

13. The apparatus of claim 1, wherein the first cache comprises a last level cache.

14. The apparatus of claim 1, wherein at least one of the class information determined at the first access level or the class information determined at the second access level comprises one or more bits stored within a page table entry cached in a translation lookaside buffer.

15. A method comprising:
retrieving a first memory page from a storage device in response to a page fault issued after an attempt to retrieve data in the first memory page from a physical address space of a main memory of an external memory system; and
managing memory pages from a processor that includes (1) at least one memory management unit coupled to the external memory system, and (2) at least one central processing unit configured to run a hypervisor at a first access level and at least one guest operating system at a second access level, the managing including:
at the second access level, translating from virtual addresses in a virtual address space to intermediate physical addresses in an intermediate physical address space using mappings in a first page table accessed by the guest operating system;
at the second access level, determining class information for a second memory page mapped by the first page table based on a classification of virtual addresses within the virtual address space, wherein the class information determined at the second access level is independent from: (1) any bits used to indicate virtual addresses, and (2) any bits used to indicate intermediate physical addresses;
at the first access level, translating from the intermediate physical addresses to physical addresses in the physical address space of the main memory using mappings in a second page table accessed by the hypervisor;
at the first access level, determining class information for the second memory page mapped by the second page table based on a classification of intermediate physical addresses within the intermediate physical address space, wherein the class information determined at the first access level is independent from: (1) any bits used to indicate intermediate physical addresses, and (2) any bits used to indicate physical addresses; and
processing class information for the second memory page determined at different access levels to determine processed class information for the second memory page using a dynamic processing rule.

16. The method of claim 15, further comprising issuing the attempt to retrieve the data in the first memory page in response to a cache miss issued after an attempt to retrieve the data in the first memory page from a first cache line of a first cache of the external memory system.

17. The method of claim 16, wherein the managing further includes using the processed class information to store cache lines in selected portions of the first cache.

18. The method of claim 15, wherein the first access level has a higher privilege than the second access level.

19. The method of claim 18, wherein the central processing unit is configured to manage security for physical addresses in the physical address space of the main memory at a third security level that has a higher privilege than the first access level.

20. The method of claim 19, wherein processing class information for the second memory page determined at different access levels includes processing class information determined at three or more different access levels.

21. The method of claim 15, wherein at least one of the class information determined at the first access level or the class information determined at the second access level is determined based on classification of addresses according to attributes of blocks of data within the second memory page.

22. The method of claim 21, wherein the attributes of blocks of data within the second memory page comprise estimated reuse of the blocks of data within the second memory page.

23. The method of claim 22, wherein the estimated reuse of the blocks of data within the second memory page comprises an estimated miss rate for the blocks of data within the second memory page.

24. The method of claim 15, wherein the dynamic processing rule comprises selecting between the class information determined at the first access level and the class information determined at the second access level based on content of one or both of the class information determined at the first access level and the class information determined at the second access level.

25. The method of claim 15, wherein the dynamic processing rule comprises combining the class information determined at the first access level and the class information determined at the second access level according to a predetermined function.

26. The method of claim 1, wherein the dynamic processing rule is changed at runtime by the guest operating system or the hypervisor.

27. The method of claim 15, wherein the first cache comprises a last level cache.

28. The method of claim 15, wherein at least one of the class information determined at the first access level or the class information determined at the second access level comprises one or more bits stored within a page table entry cached in a translation lookaside buffer.

\* \* \* \* \*